United States Patent
Okino

(10) Patent No.: US 8,862,114 B2
(45) Date of Patent: Oct. 14, 2014

(54) RADIO COMMUNICATION SYSTEM, RADIO BASE STATION, AND COMMUNICATION CONTROL METHOD

(75) Inventor: Kenta Okino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 112 days.

(21) Appl. No.: 13/805,288

(22) PCT Filed: Jun. 15, 2011

(86) PCT No.: PCT/JP2011/063694
§ 371 (c)(1),
(2), (4) Date: Dec. 18, 2012

(87) PCT Pub. No.: WO2011/158862
PCT Pub. Date: Dec. 22, 2011

(65) Prior Publication Data
US 2013/0095811 A1    Apr. 18, 2013

(30) Foreign Application Priority Data
Jun. 18, 2010  (JP) .................................. 2010-140010

(51) Int. Cl.
*H04W 52/02*    (2009.01)
(52) U.S. Cl.
CPC ...... *H04W 52/0219* (2013.01); *H04W 52/0206* (2013.01); *Y02B 60/50* (2013.01)
USPC ......................................... 455/418; 455/420
(58) Field of Classification Search
USPC ................. 455/418–420, 422.1, 436–443
See application file for complete search history.

(56) References Cited

U.S. PATENT DOCUMENTS 6,044,067 A *  3/2000  Suzuki ........................ 370/252
6,226,502 B1 *  5/2001  Chung ......................... 455/118

FOREIGN PATENT DOCUMENTS

| JP | H10-209947 A | 8/1998 |
| JP | 2000-232669 A | 8/2000 |
| JP | 2006-352477 A | 12/2006 |
| JP | 2007-318698 A | 12/2007 |

OTHER PUBLICATIONS

3GPP TS 36.423 V9.2.0 (Mar. 2010); 3rd Generation Partnership Project; Technical Specification Group Radio Access Network; Evolved Universal Terrestrial Radio Access Network (E-UTRAN); X2 application protocol (X2AP) (Release 9); pp. 1-120.

(Continued)

*Primary Examiner* — Kashif Siddiqui
(74) *Attorney, Agent, or Firm* — Studebaker & Brackett PC

(57) ABSTRACT

Disclosed is a radio communication system which has: a radio base station (eNB#1), which forms a first cell, and which has a radio terminal connected to the radio base station (eNB#1), said radio terminal being in the first cell; and a radio base station (eNB#2), which forms a second cell, at least a part of which overlaps the first cell, and which has a radio terminal connected to the radio base station (eNB#2), said radio terminal being in the second cell. The radio base station (eNB#1) is so configured as to be switchable from being in the activated mode to being in the deactivated mode wherein power consumption is less than that in the activated mode. The radio base station (eNB#1) is controlled to be switched to be in the deactivated mode from being in the activated mode after the conditions, which indicate that the radio terminal (UE) connected to the radio base station (eNB#1) is connectable to the radio base station (eNB#2), are satisfied in the activated mode.

11 Claims, 9 Drawing Sheets

(56) References Cited

OTHER PUBLICATIONS

3GPP TR 32.826 V1.1.0 (Jan. 2010); 3rd Generation Partnership Project; Technical Specification Group Services and System Aspects; Telecommunication management; Study on Energy Savings Management (ESM) (Release 9); pp. 1-32.

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); pp. 1-23.

International Search Report; PCT/JP2011/063694; Sep. 13, 2011; with translation.

An Office Action; "Notice of Reason for Rejection," issued by the Japanese Patent Office on Feb. 25, 2014, which corresponds to Japanese Patent Application No. 2010-140010 and is related to U.S. Appl. No. 13/805,288; with English language statement of relevance.

* cited by examiner

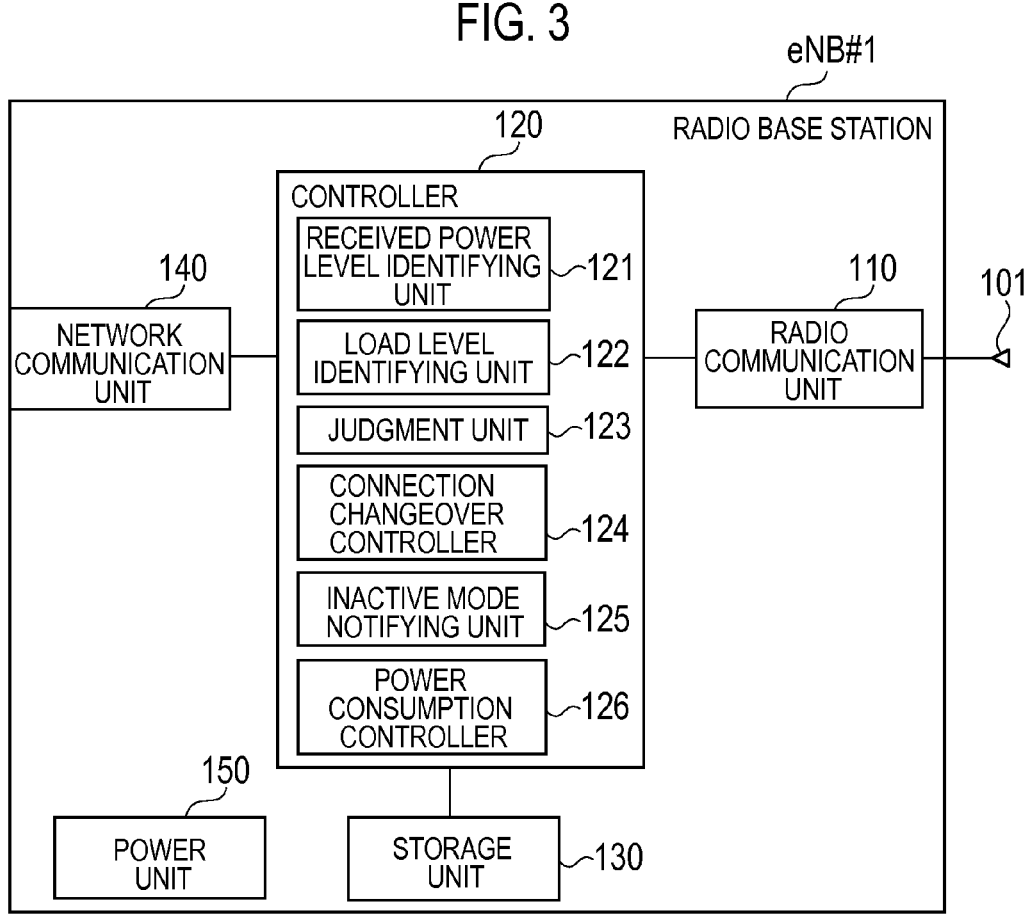
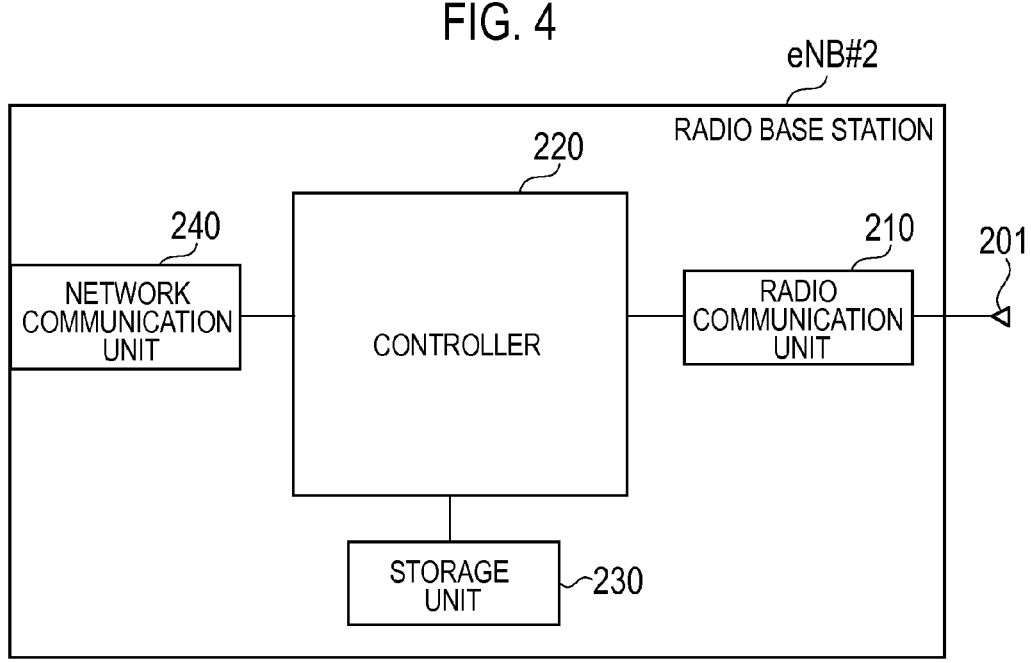

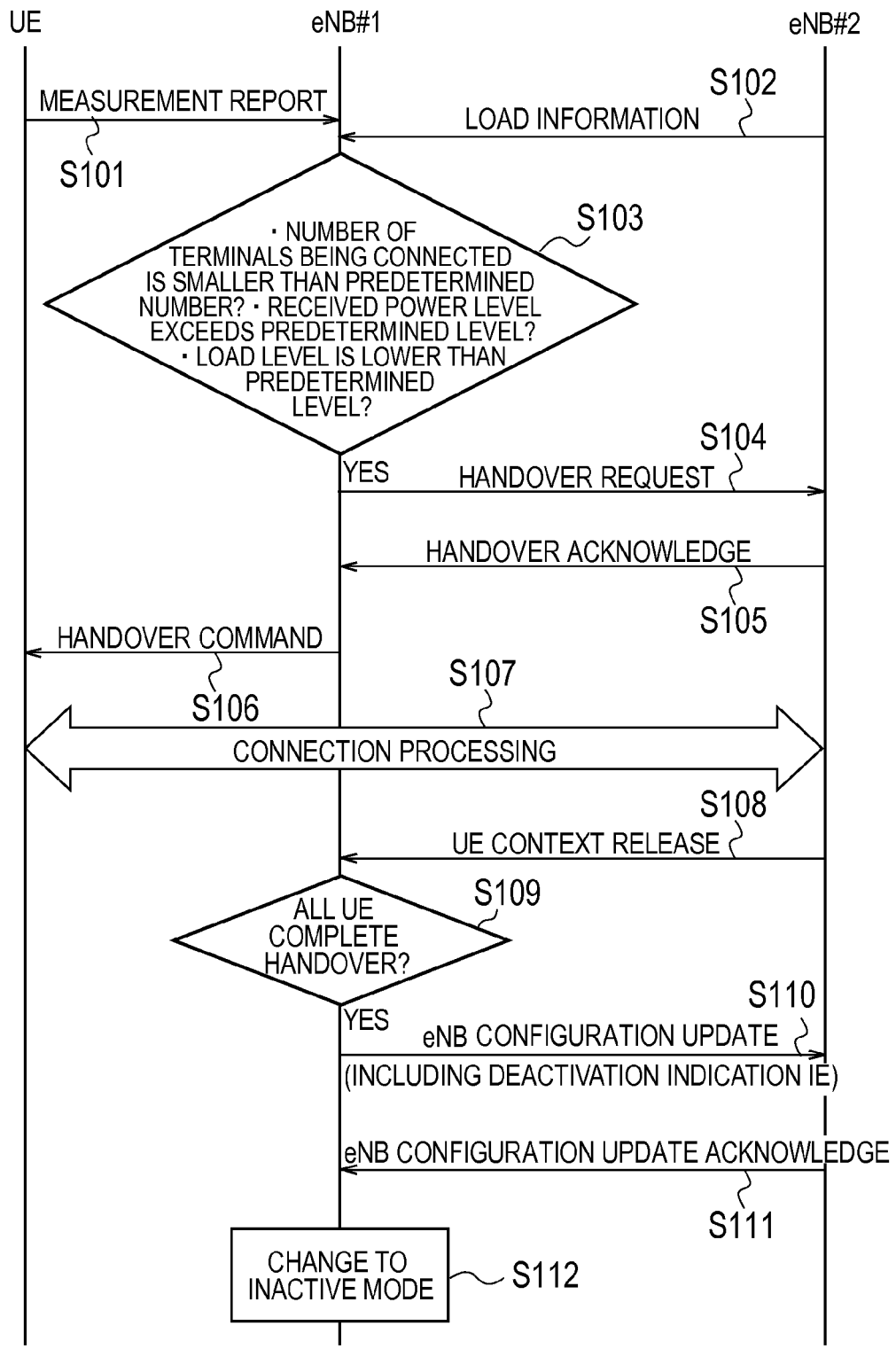

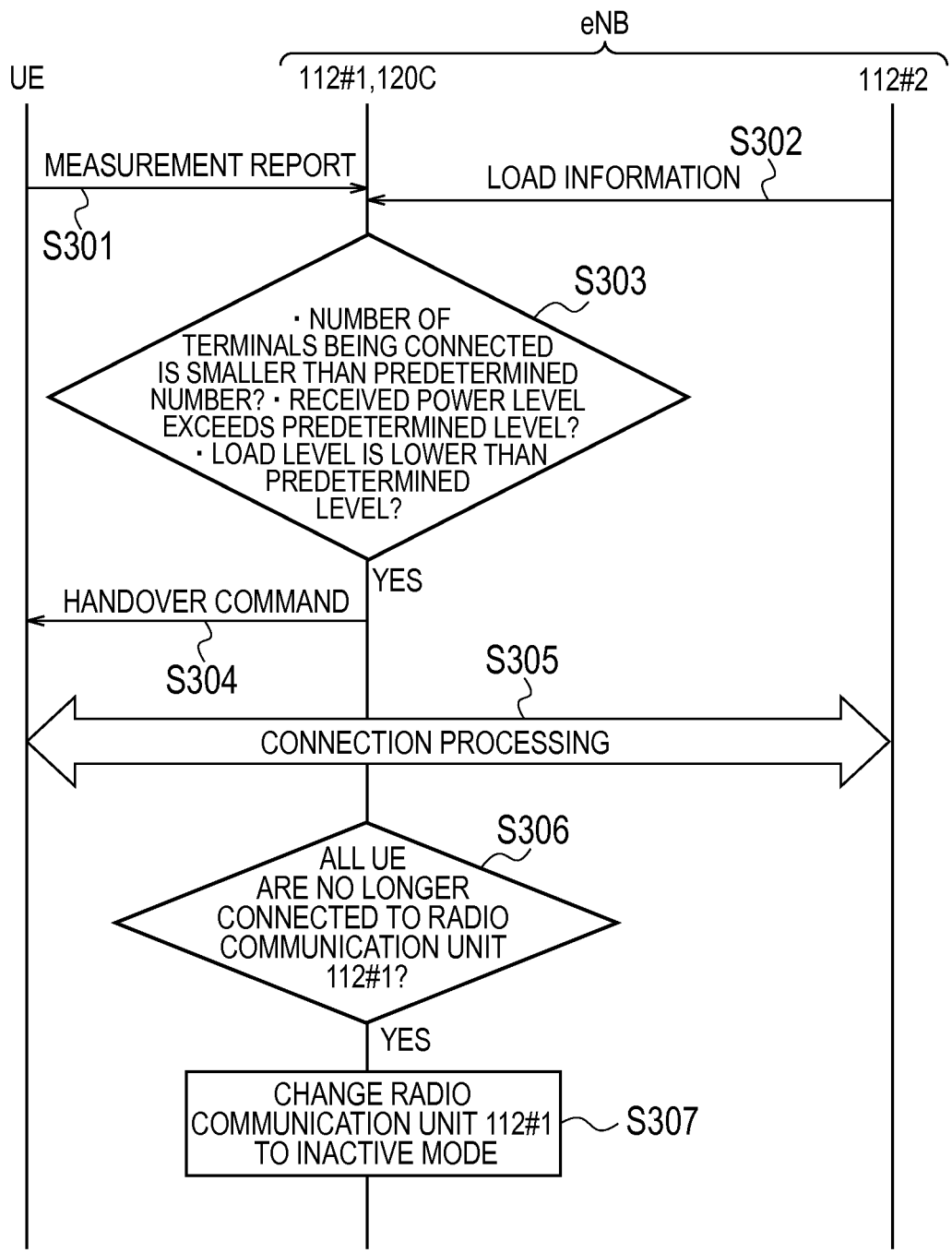

RADIO COMMUNICATION SYSTEM, RADIO BASE STATION, AND COMMUNICATION CONTROL METHOD

TECHNICAL FIELD

The present invention relates to a radio communication system, a radio base station, and a communication control method which employ SON technology.

BACKGROUND ART

SON (Self Organizing Network) technology is employed in LTE (Long Term Evolution) which is standardized by the 3GPP (3rd Generation Partnership Project) as a radio communication system standardization organization. SON technology enables a radio base station itself to change the settings of the radio base station without human intervention.

One aspect of SON technology is an energy saving technique (see Non-patent Document 1). The energy saving technique is a technique which changes the mode of a radio base station to the power consumption saving mode (hereinafter, inactive mode) to save the power consumption of the radio base station.

Using the energy saving technique, a radio base station can notify another radio base station of the change of its mode from the active mode to the inactive mode, and can also request another radio base station to change from the inactive mode to the active mode (see Non-patent Document 2).

PRIOR ART DOCUMENTS

Non-Patent Documents

Non-patent Document 1: 3GPP TR36.902 V9.1.0
Non-patent Document 2: 3GPP TS36.423 V9.2.0

SUMMARY OF THE INVENTION

However, the energy saving techniques in Non-patent Documents 1 and 2 include no clear definition of criteria for judging if the active mode should be changed to the inactive mode. Accordingly, the energy saving technique still has room for improvement in terms of providing a good service to a radio terminal while saving power consumption of a radio base station.

Hence, an objective of the present invention is to provide a radio communication system, a radio base station, and a communication control method which are capable of providing a good service to a radio terminal while saving power consumption.

In order to solve the problem described above, the present invention has features below. First, a feature of a radio communication system is summarized as follows. The radio communication system (radio communication system 1A, 1B, or 1C) comprises: a first radio communication unit (radio communication unit 110, 111#1, or 112#1) that forms a first cell (cell C#1) and to which a radio terminal in the first cell is connected; a second radio communication unit (radio communication unit 210, 111#2, or 112#2) that forms a second cell (cell C#2) overlapping the first cell at least partially and to which a radio terminal in the second cell is connected; and a controller (controller 120A, 120B, or 120C) that controls the first radio communication unit, wherein the first radio communication unit is changeable from a first mode to a second mode where power consumption is lower than in the first mode, and in a case where the first radio communication unit is in the first mode, the controller performs control such that the first radio communication unit is changed to the second mode after satisfaction of a predetermined condition indicating that a currently-connected radio terminal being connected to the first radio communication unit is connectable to the second radio communication unit.

According to the feature, the controller performs control such that the first radio communication unit is changed to the second mode after satisfaction of a predetermined condition indicating that a currently-connected radio terminal being connected to the first radio communication unit is connectable to the second radio communication unit.

Thereby, the currently-connected radio terminal can connect to the second radio communication unit even when the first radio communication unit is switched to the second mode in order to reduce the power consumption, whereby it is possible to prevent the currently-connected radio terminal from becoming unable to perform communications. Therefore, is possible to provide a good service to a radio terminal while saving power consumption.

Another feature of a radio communication system according to the present invention is summarized as follows. In the radio communication system according to the aforementioned feature, the predetermined condition is that a received power level of a signal received by the currently-connected radio terminal from the second radio communication unit exceeds a predetermined level.

Another feature of a radio communication system according to the present invention is summarized as follows. In the radio communication system according to the aforementioned feature, the first mode is a mode where power is supplied to the first radio communication unit, and the second mode is a mode where power supply to the first radio communication unit is stopped.

Another feature of a radio communication system according to the present invention is summarized as follows. In the radio communication system according to the aforementioned feature, in the case where the first radio communication unit is in the first mode, the controller performs control such that the first radio communication unit is changed to the second mode if the number of currently-connected radio terminals is smaller than a predetermined number and after the predetermined condition is satisfied.

Another feature of a radio communication system according to the present invention is summarized as follows. In the radio communication system according to the aforementioned feature, the controller performs control such that a connection target of each currently-connected radio terminal is changed to the second radio communication unit if the number of currently-connected radio terminals is smaller than the predetermined number and if the predetermined condition is satisfied, in the case where the first radio communication unit is in the first mode, and performs control such that the first radio communication unit is changed to the second mode after the connection targets of all the currently-connected radio terminals are changed to the second radio communication unit.

Another feature of a radio communication system according to the present invention is summarized as follows. In the radio communication system according to the aforementioned feature, in the case where the first radio communication unit is in the first mode, the controller performs control such that the connection target of each currently-connected radio terminal is changed to the second radio communication unit if the number of currently-connected radio terminals is smaller than the predetermined number, if the predetermined condition is satisfied, and if a load level of the second radio communication unit is lower than a predetermined level.

Another feature of a radio communication system according to the present invention is summarized as follows. In the radio communication system according to the aforementioned feature, the first radio communication unit and the controller are provided in a first radio base station (radio base station eNB#1), and the second radio communication unit is provided in a second radio base station (radio base station eNB#2) neighboring the first radio base station.

Another feature of a radio communication system according to the present invention is summarized as follows. In the radio communication system according to the aforementioned feature, the first cell is formed using a given frequency band, the second cell is formed using a frequency band different from the given frequency band, and the first radio communication unit, the second radio communication unit, and the controller are provided in one radio base station.

Another feature of a radio communication system according to the present invention is summarized as follows. In the radio communication system according to the aforementioned feature, the first radio communication unit is provided in a first small radio device (small radio device RRH#1), the second radio communication unit is provided in a second small radio device (small radio device RRH#2) neighboring the first small radio device, the controller is provided in a control device (control device 300) that controls the first small radio device and the second small radio device, and the first small radio device, the second small radio device, and the control device form one radio base station.

A feature of a radio base station is summarized as follows. A radio base station used in a radio communication system including: a first radio communication unit that forms a first cell and to which a radio terminal in the first cell is connected; and a second radio communication unit that forms a second cell overlapping the first cell at least partially and to which a radio terminal in the second cell is connected, the radio base station comprises a controller that controls the first radio communication unit, wherein the first radio communication unit is changeable from a first mode to a second mode where power consumption is lower than in the first mode, and in a case where the first radio communication unit is in the first mode, the controller performs control such that the first radio communication unit is changed to the second mode after satisfaction of a predetermined condition indicating that a currently-connected radio terminal being connected to the first radio communication unit is connectable to the second radio communication unit.

A feature of a communication control method is summarized as follows. A communication control method used in a radio communication system including: a first radio communication unit that forms a first cell and to which a radio terminal in the first cell is connected; and a second radio communication unit that forms a second cell overlapping the first cell at least partially and to which a radio terminal in the second cell is connected, the first radio communication unit being changeable from a first mode to a second mode where power consumption is lower than in the first mode, the method comprises the step of performing control such that the first radio communication unit is changed to the second mode after satisfaction of a predetermined condition indicating that a currently-connected radio terminal being connected to the first radio communication unit is connectable to the second radio communication unit, in a case where the first radio communication unit is in the first mode.

BRIEF DESCRIPTION OF THE DRAWINGS

FIG. 3 is a block diagram showing the configuration of a radio base station eNB#1 according to the first embodiment.

FIG. 4 is a block diagram showing the configuration of a radio base station eNB#2 according to the first embodiment.

FIG. 5 is an operational sequence diagram showing the operation of the radio communication system according to the first embodiment.

FIG. 11 is an operational sequence diagram showing the operation of the radio communication system according to the third embodiment.

DETAILED DESCRIPTION OF THE EMBODIMENTS

Figure 1:
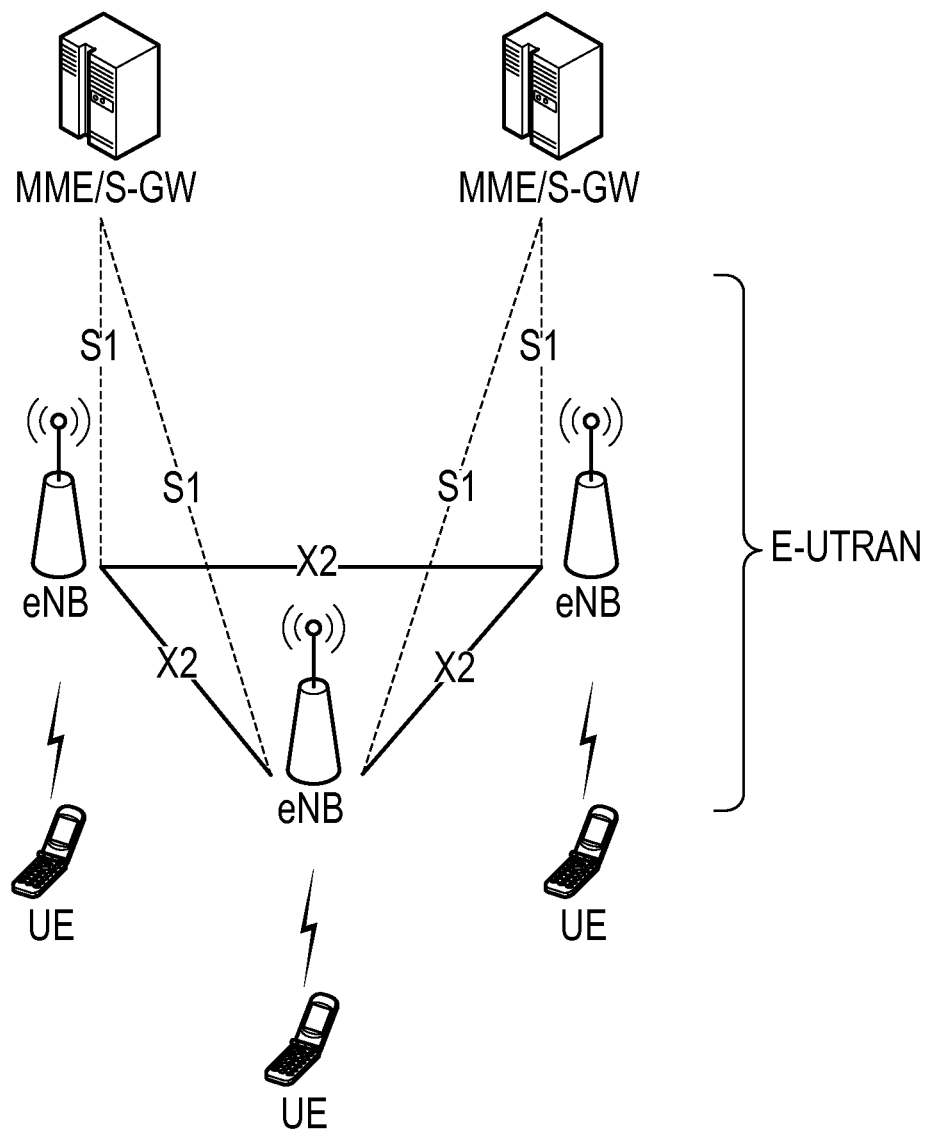
FIG. 1 is a diagram for describing the outline of a LTE system.

First to third and other embodiments of the present invention will be described with reference to the drawings. In the following drawings of the embodiments, the same or similar portions are assigned the same or similar reference numerals.

(1) First Embodiment

A first embodiment of the present invention will be described in the following order: (1.1) Outline of LTE System; (1.2) Configuration of Radio Communication System; (1.3) Configuration of Radio Base Station; (1.4) Operation of Radio Communication System; (1.5) Effect of First Embodiment; and (1.6) Modification of First Embodiment.

(1.1) Outline of LTE System

FIG. 1 is a diagram for describing the outline of a LTE system.

As shown in FIG. 1, multiple radio base stations eNB constitute E-UTRAN (Evolved-UMTS Terrestrial Radio Access Network). Each of the multiple radio base stations eNB forms a cell being a communication area in which a service should be provided to a radio terminal UE. The radio terminal UE is a radio communication device held by the user and is also called user equipment.

Every two adjacent radio base stations eNB can communicate with each other via an X2 interface which is a logical communication channel for providing communications between the base stations. Each of the multiple radio base stations eNB can communicate with the EPC (Evolved Packet Core), more specifically, with the MME (Mobility Management Entity)/S-GW (Serving Gateway) via an S1 interface.

(1.2) Configuration of Radio Communication System

Figure 2:
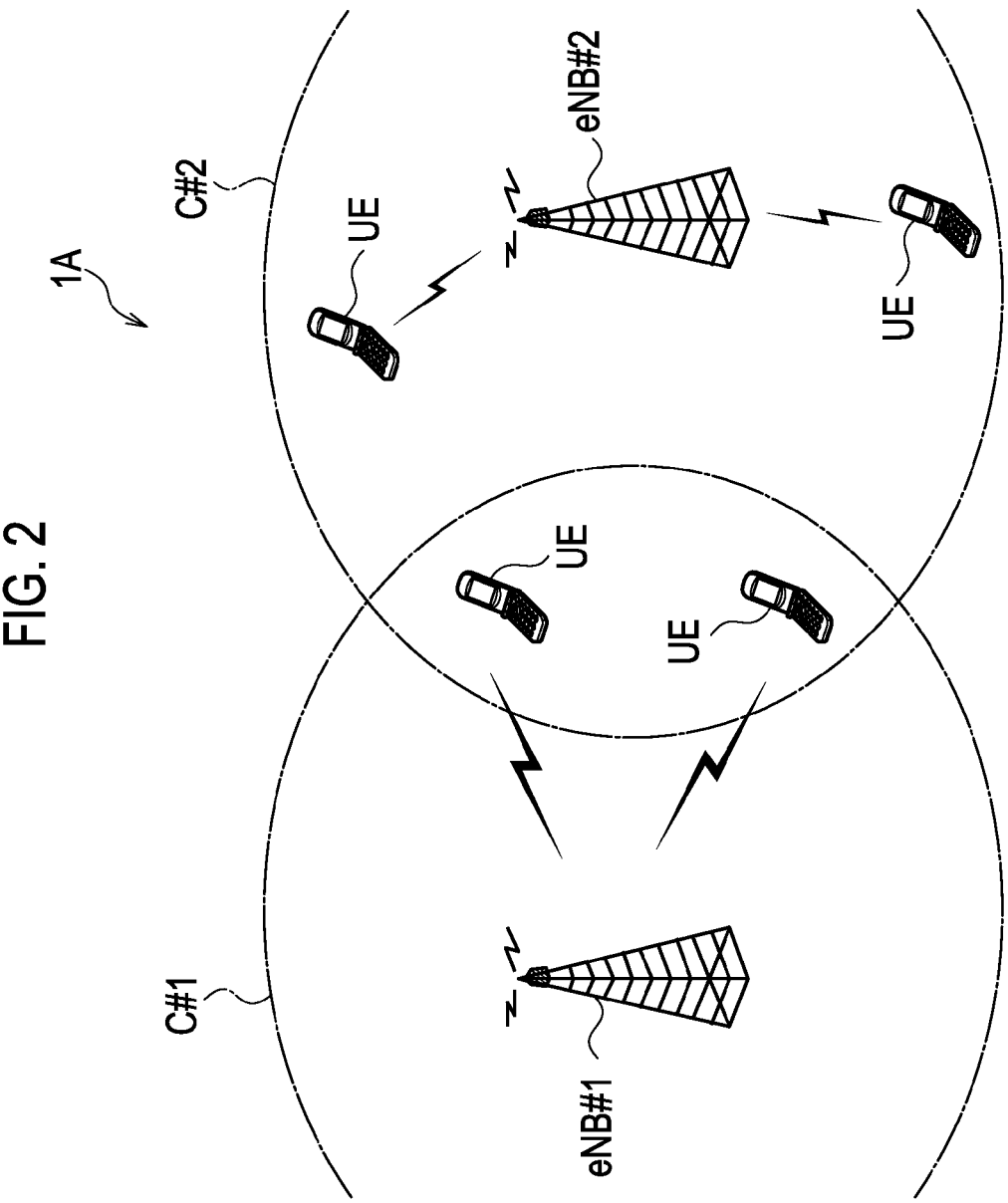
FIG. 2 is a schematic configuration diagram showing the schematic configuration of a radio communication system according to a first embodiment.

FIG. 2 is a schematic configuration diagram showing the schematic configuration of a radio communication system 1A according to the first embodiment.

As shown in FIG. 2, the radio communication system 1A includes: a radio base station eNB#1 forming a cell C#1; and a radio base station eNB#2 neighboring the radio base station eNB#1 and forming a cell C#2. The radio base station eNB#1 and the radio base station eNB#2 can perform inter-base station communications using the X2 interface described above.

The radio communication system 1A includes radio terminals UE which are connected to the radio base station eNB#1 in the cell C#1. The radio base station eNB#1 performs radio communications with the radio terminals UE connected to the radio base station eNB#1.

The radio communication system 1A also includes radio terminals UE which are connected to the radio base station eNB#2 in the cell C#2. The radio base station eNB#2 performs radio communications with the radio terminals UE connected to the radio base station eNB#2.

The cell C#2 partially overlaps the cell C#1. The two radio terminals UE connected to the radio base station eNB#1 are located in the portion where the cell C#1 and the cell C#2 overlap each other. Hence, the two radio terminals UE connected to the radio base station eNB#1 are in a state where their connection target can be changed to the radio base station eNB#2.

It should be noted that the "connection" of each radio terminal UE to the radio base station eNB#2 is assumed as a state where the radio terminal UE is currently performing communications with a communication target via the radio base station eNB#2 (Connected state); however, this may be a concept also including a state where the radio terminal UE is currently standing by for the radio base station eNB#2 (Idle state).

Each radio terminal UE measures the received power level of a reference signal (RSRP: Reference Signal Received Power) received from each of the radio base station eNB#1 and the radio base station eNB#2, and sends its connection target radio base station eNB a report on the measurement result of the received power level (measurement report). The measurement report may be sent from the radio terminal UE to the radio base station eNB with a certain event set by the radio base station eNB as a trigger, or instead may be sent from the radio terminal UE to the radio base station eNB regularly.

Each of the two radio terminals UE connected to the radio base station eNB#1 sends the radio base station eNB#1 a measurement report including information on the received power level measured with respect to the radio base station eNB#1 and information on the received power level measured with respect to the radio base station eNB#2.

Each of the radio base station eNB#1 and the radio base station eNB#2 sends and receives load information on the load level of the station itself by using the X2 interface described above. As such load information, four categories are defined: (a) Radio Resource Status; (b) S1 TNL Load Indicator; (c) Hardware Load Indicator; and (d) Composite Available Capacity Group (see 3GPP TS36.423).

Radio Resource Status indicates the number of PRBs (Physical Resource Blocks) being used, the PRB being the allocation unit of time-frequency resources. More specifically, Radio Resource Status indicates the number of PRBs being used for guaranteed bit-rate traffic, the number of PRBs being used for non-guaranteed bit-rate traffic, and the total number of PRBs being used, in each of Downlink and Uplink.

S1 TNL Load Indicator indicates the load of a backhaul between a radio base station eNB and a core network (S1 interface). The load in each of Downlink and Uplink is represented by any of: low load; middle load; high load; and overload.

Hardware Load Indicator indicates the load of hardware of a radio base station eNB (such as CPU). The load in each of Downlink and Uplink is represented by any of: low load; middle load; high load; and overload.

Composite Available Capacity Group indicates a capacity class, which is an index indicating the relative communication capacity of a radio base station, and the ratio of the communication capacity usable in that capacity (in each of Downlink and Uplink).

(1.3) Configuration of Radio Base Station

Next, the configuration of a radio base station according to the first embodiment will be described in the following order; (1.3.1) Configuration of Radio Base Station eNB#1; and (1.3.2) Configuration of Radio Base Station eNB#2.

(1.3.1) Configuration of Radio Base Station eNB#1

FIG. 3 is a block diagram showing the configuration of the radio base station eNB#1.

As shown in FIG. 3, the radio base station eNB#1 includes: an antenna 101; a radio communication unit 110; a controller 120A; a storage unit 130; a network communication unit 140; and a power unit 150.

The antenna 101 is used for sending and receiving radio signals.

The radio communication unit 110 includes a radio frequency (RF) circuit, a baseband (BB) circuit, and the like, for example, and exchanges radio signals with each radio terminal UE, which is connected to the radio base station eNB#1, through the antenna 101. The radio communication unit 110 also modulates a sending signal and demodulates a reception signal. The radio communication unit 110 further receives the above-mentioned measurement report from each radio terminal UE connected to the radio base station eNB#1, i.e., each radio terminal UE connected to the radio communication unit 110. In the first embodiment, the radio communication unit 110 corresponds to a first radio communication unit.

The controller 120A includes a CPU, for example, and controls various functions that the radio base station eNB#1 has. In the first embodiment, the controller 120A corresponds to a controller configured to control the first radio communication unit. The storage unit 130 includes a memory, for example, and stores various kinds of information used for, for example, the control of the radio base station eNB#1.

The network communication unit 140 performs inter-base station communications with the radio base station eNB#2 by using the X2 interface. The network communication unit 140 exchanges the above-mentioned load information with the radio base station eNB#2 by using the X2 interface. The network communication unit 140 also exchanges messages with the radio base station eNB#2 by using the X2 interface, the message relating to handover (i.e., change of the connection target) of each radio terminal UE connected to the radio base station eNB#1.

The power unit 150 supplies power to each of the blocks of the radio base station eNB#1. Under control of the controller 120A, the power unit 150 changes whether or not to supply power to each of the blocks of the radio base station eNB#1. The power unit 150 supplies power to each of the blocks of the radio base station eNB#1 in a normal state. Meanwhile, the power unit 150 stops power supply at least to the radio communication unit 110 for the purpose of saving power consumption.

In the following description, a mode where the power unit 150 supplies power to each of the blocks of the radio base station eNB#1 is called an "active mode (first mode);" and a mode where the power unit 150 stops power supply at least to the radio communication unit 110 is called an "inactive mode (second mode)."

The controller 120A includes: a received power level identifying unit 121; a load level identifying unit 122; a judgment unit 123; a connection changeover controller 124; an inactive mode notifying unit 125; and a power consumption controller 126.

The received power level identifying unit 121 identifies received power levels of the radio base stations eNB#1 and eNB#2, respectively, at each radio terminal UE connected to the radio base station eNB#1 on the basis of the measurement report that the radio communication unit 110 receives from the radio terminal UE.

The load level identifying unit 122 identifies the load level of the radio base station eNB#2 on the basis of the load information that the network communication unit 140 receives from the radio base station eNB#2.

The judgment unit 123 makes the following three judgments in the active mode on the basis of the received power levels identified by the received power level identifying unit 121 and the load level identified by the load level identifying unit 122.

Firstly, the judgment unit 123 judges whether or not the number of radio terminals UE being connected to the radio base station eNB#1 is smaller than a predetermined number. The number of radio terminals UE being connected to the radio base station eNB#1 is identified based on the state of use of frequency resources or radio bearers and on information from the MME. Here, the predetermined number is set in advance at such a value that the load level of the radio base station eNB#2 would not be increased too much even if the radio terminals UE connected to the radio base station eNB#1 change their connection target to the radio base station eNB#2 different from the radio base station eNB#1; and the predetermined number is stored in the storage unit 130.

Secondly, the judgment unit 123 judges whether or not each radio terminal UE connected to the radio base station eNB#1 can be connected to the radio base station eNB#2. More specifically, the judgment unit 123 judges whether or not the received power level of the reference signal, which each radio terminal UE connected to the radio base station eNB#1 receives from the radio base station eNB#2, exceeds a predetermined level. The received power level of the reference signal is the one identified by the received power level identifying unit 121. Here, the predetermined level is set in advance at such a value that each radio terminal UE connected to the radio base station eNB#1 can receive control information from the radio base station eNB#2 normally when the radio terminal UE changes its connection target to the radio base station eNB#2 different from the radio base station eNB#1; and the predetermined level is stored in the storage unit 130.

Thirdly, the judgment unit 123 judges whether or not the load level of the radio base station eNB#2 is lower than a predetermined level. The load level of the radio base station eNB#2 is identified by the load level identifying unit 122. Here, the predetermined level is set in advance at a value within such a range of the load level that allows the radio base station eNB#2 to operate normally; and the predetermined level is stored in the storage unit 130.

When all of the above three judgment results are positive, the judgment unit 130 notifies the connection changeover controller 124 of this fact. More specifically, when the number of radio terminals UE being connected to the radio base station eNB#1 is smaller than the predetermined number, when the received power level of the reference signal, which each radio terminal UE connected to the radio base station eNB#1 receives from the radio base station eNB#2, exceeds the predetermined level, and when the load level of the radio base station eNB#2 is lower than the predetermined level, the judgment unit 123 notifies the connection changeover controller 124 of this fact.

The connection changeover controller 124 performs handover control upon notification from the judgment unit 123 of the fact that all the above three judgment results are positive, the handover control being performed to change the connection target of each radio terminal UE, which is connected to the radio base station eNB#1, to the radio base station eNB#2. For such handover control, a handover sequence in compliance with 3GPP TS36.300 can be employed, for example.

The inactive mode notifying unit 125 generates an eNB Configuration Update message containing Deactivation Indication IE, which is an information element indicating the change from the active mode to the inactive mode, after the connection target of each radio terminal UE connected to the radio base station eNB#1 is changed to the radio base station eNB#2 by the connection changeover controller 124. The eNB Configuration Update message containing Deactivation Indication IE is inputted to the network communication unit 140

The network communication unit 140 sends the eNB Configuration Update message to the radio base station eNB#2 by using the X2 interface. The network communication unit 140 also receives an eNB Configuration Update Acknowledge message, which is a positive response to the eNB Configuration Update message, by using the X2 interface.

The power consumption controller 126 controls the power unit 150 such that the active mode is changed to the inactive mode, when the network communication unit 140 receives the eNB Configuration Update Acknowledge message.

The network communication unit 140 also receives a Cell Activation Request message from the radio base station eNB#2 by using the X2 interface, the Cell Activation Request message being a message for changing the radio base station eNB#1 from the inactive mode to the active mode. The network communication unit 140 then sends a Cell Activation Response message, which is a positive response to the Cell Activation Request message, to the radio base station eNB#2 by using the X2 interface. The power consumption controller 126 controls the power unit 150 such that the inactive mode is changed to the active mode when the network communication unit 140 sends the Cell Activation Response message.

(1.3.2) Configuration of Radio Base Station eNB#2

FIG. 4 is a block diagram showing the configuration of the radio base station eNB#2. The outline of the radio base station eNB#2 only will be described here because this station has low relevance to the present invention.

As shown in FIG. 4, the radio base station eNB#2 includes: an antenna 201; a radio communication unit 210; a controller 220; a storage unit 230; and a network communication unit 240.

The antenna 201 is used for sending and receiving a radio signal. The radio communication unit 210 includes a radio frequency (RF) circuit, a baseband (BB) circuit, and the like, for example, and exchanges radio signals with each radio terminal UE through the antenna 201. In addition, the radio communication unit 210 modulates a sending signal and demodulates a reception signal. In the first embodiment, the radio communication unit 210 corresponds to a second radio communication unit.

The controller 220 includes a CPU, for example, and controls various functions that the radio base station eNB#2 has. The storage unit 230 includes a memory, for example, and stores various kinds of information used for, for example, the control of the radio base station eNB#2. The network communication unit 240 performs inter-base station communications with the radio base station eNB#1 by using the X2 interface.

(1.4) Operation of Radio Communication System

FIG. 5 is an operational sequence diagram showing the operation of the radio communication system 1A according to the first embodiment. Although one radio terminal UE is connected to the radio base station eNB#1 here, two or more radio terminals UE may be connected to the radio base station eNB#1.

In Step S101, the radio communication unit 110 of the radio base station eNB#1 receives a measurement report from each radio terminal UE connected to the radio base station eNB#1. Based on the measurement reports received by the radio communication unit 110, the received power level identifying unit 121 of the radio base station eNB#1 identifies received power levels, of each radio terminal UE, corresponding respectively to the radio base stations eNB#1 and eNB#2.

In Step S102, the network communication unit 140 of the radio base station eNB#1 receives load information from the radio base station eNB#2. The load level identifying unit 122 of the radio base station eNB#1 identifies the load level of the radio base station eNB#2 on the basis of the load information that the network communication unit 140 receives from the radio base station eNB#2.

In Step S103, the judgment unit 123 of the radio base station eNB#1 makes the above three judgments on the basis of the received power levels identified by the received power level identifying unit 121 and the load level identified by the load level identifying unit 122. The process moves to Step S104 if all of the above three judgment results are positive, whereas the process returns to the beginning of this sequence if any of the above three judgment results is negative.

In Step S104, the connection changeover controller 124 of the radio base station eNB#1 generates a Handover Request message indicating request for acceptance of each radio terminal UE, and outputs the generated Handover Request message to the network communication unit 140. The network communication unit 140 sends the Handover Request message to the radio base station eNB#2 by using the X2 interface.

In Step S105, the radio base station eNB#2 sends the radio base station eNB#1 a Handover Acknowledge message indicating that acceptance of the radio terminal UE is permitted. The network communication unit 140 of the radio base station eNB#1 receives the Handover Acknowledge message.

In Step S106, the connection changeover controller 124 of the radio base station eNB#1 generates a Handover Command message indicating instructions for handover to the radio base station eNB#2, and outputs the generated Handover Command message to the radio communication unit 110. The radio communication unit 110 sends the radio terminal UE the Handover Command message indicating instructions for handover to the radio base station eNB#2.

In Step S107, the radio terminal UE performs connection processing with the radio base station eNB#2. More specifically, the radio terminal UE establishes synchronization with the radio base station eNB#2, establishes RRC, and performs other processing.

In Step S108, the radio base station eNB#2 sends the radio base station eNB#1 a UE Context Release message indicating that the radio terminal UE is successfully handed over to the radio base station eNB#2 and thus the radio resource allocated to the radio terminal UE by the radio base station eNB#1 can be released. The network communication unit 140 of the radio base station eNB#1 receives the UE Context Release message.

In Step S109, the connection changeover controller 124 of the radio base station eNB#1 judges whether or not all the radio terminals UE having been connected to the radio base station eNB#1 complete the handover. If all the radio terminals UE having been connected to the radio base station eNB#1 complete the handover, the process moves to Step S110; if not, the process returns to the beginning of this sequence.

In Step S110, the inactive mode notifying unit 125 of the radio base station eNB#1 generates an eNB Configuration Update message containing Deactivation Indication IE, and outputs the generated eNB Configuration Update message to the network communication unit 140. The network communication unit 140 of the radio base station eNB#1 sends the eNB Configuration Update message to the radio base station eNB#2 by using the X2 interface.

In Step S111, the network communication unit 240 of the radio base station eNB#2 sends an eNB Configuration Update Acknowledge message, which is a response to the eNB Configuration Update message, to the radio base station eNB#1 by using the X2 interface. The network communication unit 140 of the radio base station eNB#1 receives the eNB Configuration Update Acknowledge message.

In Step S112, the power consumption controller 126 of the radio base station eNB#1 controls the power unit 150 such that the active mode is changed to the inactive mode.

It should be noted that, in this sequence, the power consumption controller 126 controls the power unit 150 such that the active mode is changed to the inactive mode after the reception of the eNB Configuration Update Acknowledge message; however, the power consumption controller 126 may instead control the power unit 150 such that the active mode is changed to the inactive mode when a predetermined time period elapses after the sending of the Handover Command message or when a predetermined time period elapses after the reception of the UE Context Release message.

(1.5) Effect of First Embodiment

As has been de scribed, in the active mode, the controller 120A of the radio base station eNB#1 controls the power unit 150 such that the active mode is changed to the inactive mode after satisfaction of the condition where the received power level of the reference signal, which each radio terminal UE connected to the radio base station eNB#1 receives from the radio base station eNB#2, exceeds the predetermined level. In the inactive mode, power supply to the radio communication unit 110 is stopped.

Thereby, the radio communication unit 110 is stopped and the connection between the radio communication unit 110 and each radio terminal UE is disconnected; however, the radio terminals UE having been connected to the radio base station eNB#1 can be connected to the radio base station eNB#2. This can prevent each radio terminal UE from becoming unable to perform communications. The radio communication unit 110 is a block which consumes the largest power in the radio base station eNB#1. Hence, the power consumption of the radio base station eNB#1 can be remarkably saved by stopping power supply to the radio communication unit 110.

In the first embodiment, in the active mode, the controller 120A of the radio base station eNB#1 controls the power unit 150 such that the active mode is changed to the inactive mode after satisfaction of the condition where the number of radio terminals UE being connected to the radio base station eNB#1 is smaller than the predetermined number.

If the active mode is changed to the inactive mode when the number of radio terminals UE being connected to the radio base station eNB#1 is large, a large number of UEs are reconnected to the different radio base station eNB#2, which increases a load on the radio base station eNB#2. For this reason, the active mode is not changed to the inactive mode when the number of radio terminals UE being connected to the radio base station eNB#1 is large. Thereby, the load on the different radio base station eNB#2 can be prevented from being increased.

In the first embodiment, in the active mode, the controller 120A of the radio base station eNB#1 controls the power unit 150 such that the active mode is changed to the inactive mode after satisfaction of the condition where the load level of the radio base station eNB#2 is lower than the predetermined level.

If the radio base station eNB#1 is changed from the active mode to the inactive mode when the load level of the radio base station eNB#2 is high, the radio terminals UE connected to the radio base station eNB#1 are reconnected to the radio base station eNB#2, which in turn might make the load on the radio base station eNB#2 exceed the capacity of the radio base station eNB#2. For this reason, the radio base station eNB#1 is changed from the active mode to the inactive mode only when the load level of the radio base station eNB#2 is not high. Thereby, the load on the radio base station eNB#2 can be prevented from exceeding the capacity of the radio base station eNB#2.

In the first embodiment, the power unit 150 is controlled to change from the active mode to the inactive mode after the radio terminals UE having been connected to the radio base station eNB#1 complete the handover to the radio base station eNB#2. This can prevent disconnection of communication of each radio terminal UE connected to the radio base station eNB#1. Accordingly, a good service can be provided to each radio terminal UE having been connected to the radio base station eNB#1 while the power consumption of the radio base station eNB#1 is saved.

(1.6) Modification of First Embodiment

In the first embodiment described above, the judgment unit 123 judges whether or not the received power level of the reference signal, which each radio terminal UE connected to the radio base station eNB#1 receives from the radio base station eNB#2, exceeds the predetermined level, in order to judge whether or not the radio terminal UE connected to the radio base station eNB#1 can be connected to the radio base station eNB#2.

However, the judgment method is not limited to one based on the received power level of the reference signal; instead, a judgment method based on positional information of each radio terminal UE connected to the radio base station eNB#1 may be used. More specifically, whether or not each radio terminal UE connected to the radio base station eNB#1 is located in the cell C#2 of the radio base station eNB#2 may be judged based on the positional information of the radio terminal UE connected to the radio base station eNB#1. Here, the following methods may be used as a method for identifying the position of each radio terminal UE.

(Position Identifying Method 1) In a case where each radio terminal UE connected to the radio base station eNB#1 has a GPS (Global Positioning System) positioning function, positional information generated with GPS is acquired for each radio terminal UE.

(Position Identifying Method 2) In a case where each radio terminal UE connected to the radio base station eNB#1 has no GPS positioning function, positional information for each radio terminal UE is acquired from a position managing server (E-SLMC: Evolved Serving Mobile Location Center) provided on a core network side. Refer to 3GPP TS36.305 for details of the position managing server (E-SLMC).

(Position Identifying Method 3) In a case where the cell C#1 formed by the radio base station eNB#1 is divided into sectors, rough positional information of each radio terminal UE can be obtained by using information, for example, on a direction where the radio base station eNB#1 is located and on the path loss between the radio base station eNB#1 and each radio terminal UE located in the sectors corresponding to the radio base station eNB#1.

(2) Second Embodiment

Next, a second embodiment of the present invention will be described in the following order: (2.1) Configuration of Radio Communication System; (2.2) Configuration of Radio Base Station; (2.3) Operation of Radio Communication System; and (2.4) Effect of Second Embodiment.

In the second embodiment, description will be given of an example of a radio communication system which employs carrier aggregation technology where multiple frequency bands (multiple component carriers) are aggregated and used for radio communications. Each component carrier has a maximum bandwidth of 20 MHz and is defined as a basic unit of a communication band. Each radio terminal UE selects a cell according to an ordinary cell selection procedure, and the cell and component carrier to which the radio terminal UE gets connected becomes a primary component carrier for the radio terminal UE. Hence, a primary component carrier is different from one radio terminal UE to another.

In the second embodiment, features different from those of the first embodiment will be mainly described and overlapping description will be omitted.

(2.1) Configuration of Radio Communication System

Figure 6:
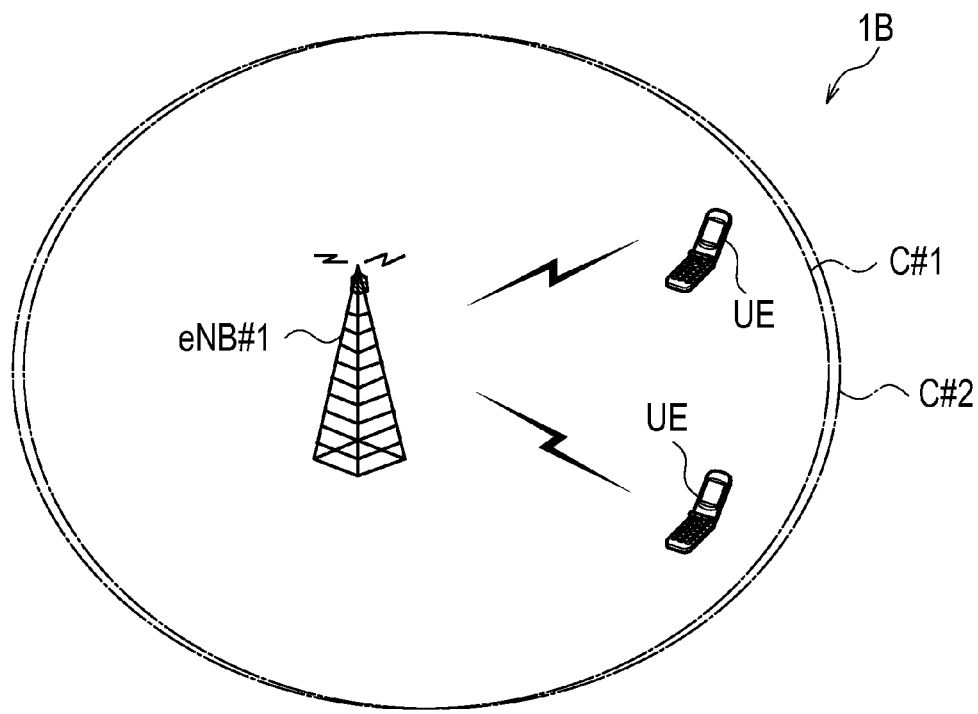
FIG. 6 is a schematic configuration diagram showing the schematic configuration of a radio communication system according to a second embodiment.

FIG. 6 is a schematic configuration diagram showing the schematic configuration of a radio communication system 1B according to the second embodiment.

As shown in FIG. 6, the radio communication system 1B includes a radio base station eNB#1 forming a cell C#1 and a cell C#2 which use different component carriers; one or more radio terminals UE connected in the cell C#1; and one or more radio terminals UE connected in the cell C#2. The radio base station eNB#1 performs radio communications with the radio terminals UE connected to the radio base station eNB#1 in the cell C#1 and the cell C#2.

The cell C#1 is formed using a component carrier #1 whereas the cell C#2 is formed using a component carrier #2. The cell C#1 and the cell C#2 overlap each other. The radio terminals UE connected to the radio base station eNB#1 are located in a portion where the cell C#1 and the cell C#2 overlap. For this reason, the radio terminals UE connected in the cell C#1 are in a state where their connection target can be changed to the cell C#2.

Each radio terminal UE measures the received power level of a reference signal (RSRP: Reference Signal Received Power) received from each of the cell C#1 and the cell C#2, and sends its connection target radio base station eNB a report on the measurement result of the received power level (measurement report).

(2.2) Configuration of Radio Base Station

Figure 7:
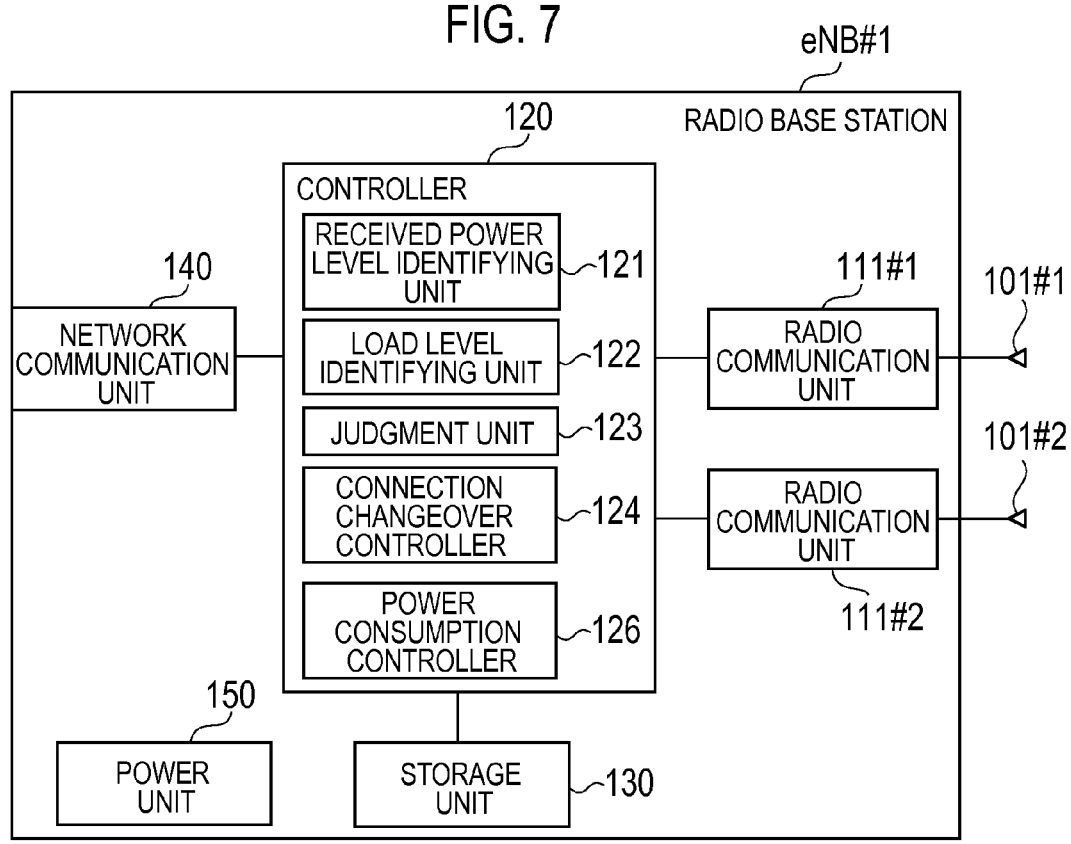
FIG. 7 is a block diagram showing the configuration of a radio base station according to the second embodiment.

Next, the configuration of the radio base station eNB#1 according to the second embodiment will be described. FIG. 7 is a block diagram showing the configuration of the radio base station eNB#1.

As shown in FIG. 7, the radio base station eNB#1 includes: an antenna 101#1; an antenna 101#2; a radio communication unit 111#1; a radio communication unit 111#2; a controller 120B; a storage unit 130; a network communication unit 140; and a power unit 150.

The antenna 101#1 is used for sending and receiving a radio signal using the component carrier #1. The antenna 101#2 is used for sending and receiving a radio signal using the component carrier #2.

The radio communication unit 111#1 includes a radio frequency (RF) circuit, a baseband (BB) circuit, and the like, for example, and exchanges radio signals with each communication unit 111#1 also modulates a sending signal and demodulates a reception signal. The radio communication unit 111#1 further receives the above-mentioned measurement report from each radio terminal UE connected in the cell C#1, i.e., each radio terminal UE connected to the radio communication unit 111#1. In the second embodiment, the radiocommunication unit 111#1 corresponds to a first radio communication unit.

The radio communication unit 111#2 includes a radio frequency (RF) circuit, a baseband (BB) circuit, and the like, for example, and exchanges radio signals with each radio terminal UE through the antenna 101#2. The radio communication unit 111#2 also modulates a sending signal and demodulates a reception signal. The radio communication unit 111#2 further receives the above-mentioned measurement report from each radio terminal UE connected in the cell C#2, i.e., each radio terminal UE connected to the radio communication unit 111#2. In the second embodiment, the radio communication unit 111#2 corresponds to a second radio communication unit.

The controller 120B includes a CPU, for example, and controls various functions that the radio base station eNB#1 has. In the second embodiment, the controller 120B corresponds to a controller configured to control the first radio communication unit. The storage unit 130 includes a memory, for example, and stores various kinds of information used for, for example, the control of the radio base station eNB#1.

The network communication unit 140 performs inter-base station communications with another radio base station eNB by using an X2 interface.

The power unit 150 supplies power to each of the blocks of the radio base station eNB#1. Under control of the controller 120B, the power unit 150 changes whether or not to supply power to each of the blocks of the radio base station eNB#1. The power unit 150 supplies power to each of the blocks of the radio base station eNB#1 in a normal state. Meanwhile, the power unit 150 stops power supply at least to the radio communication unit 111#1 for the purpose of saving power consumption.

In the second embodiment, a mode where the power unit 150 supplies power to each of the blocks of the radio base station eNB#1 is called an "active mode (first mode);" and a mode where the power unit 150 stops power supply at least to the radio communication unit 111#1 is called an "inactive mode (second mode)."

The controller 120B includes: a received power level identifying unit 121; a load level identifying unit 122; a judgment unit 123; a connection changeover controller 124; and a power consumption controller 126.

The received power level identifying unit 121 identifies received power levels of the radio communication units 111#1 and 111#2, respectively, at each radio terminal UE connected to the radio communication unit 111#1 on the basis of the measurement report that the radio communication unit 111#1 receives from the radio terminal UE.

The load level identifying unit 122 identifies the load level of the radio communication unit 111#2. The load level of the radio communication unit 111#2 indicates the number of PRBs (Physical Resource Blocks) being used in the component carrier #2, the PRB being the allocation unit of time-frequency resources, or indicates a load on the hardware of the radio communication unit 111#2.

The judgment unit 123 makes the following three judgments in the active mode on the basis of the received power levels identified by the received power level identifying unit 121 and the load level identified by the load level identifying unit 122.

Firstly, the judgment unit 123 judges whether or not the number of radio terminals UE being connected to the radio communication unit 111#1 is smaller than a predetermined number. The number of radio terminals UE being connected to the radio communication unit 111#1 is identified based on the state of use of frequency resources or radio bearers and on information from the MME. Here, the predetermined number is set in advance at such a value that the load level of the radio communication unit 111#2 would not be increased too much even if each radio terminal UE connected to the radio communication unit 111#1 changes its connection target to the radio communication unit 111#2; and the predetermined number is stored in the storage unit 130.

Secondly, the judgment unit 123 judges whether or not each radio terminal UE connected to the radio communication unit 111#1 can be connected to the radio communication unit 111#2.

More specifically, the judgment unit 123 judges whether or not the received power level of the reference signal, which each radio terminal UE connected to the radio communication unit 111#1 receives from the radio communication unit 111#2, exceeds a predetermined level. The received power level of the reference signal is the one identified by the received power level identifying unit 121. Here, the predetermined level is set in advance at such a value that each radio terminal UE connected to the radio communication unit 111#1 can receive control information from the radio communication unit 111#2 normally when the radio terminal UE changes its connection target to the radio communication unit 111#2; and the predetermined level is stored in the storage unit 130.

Alternatively, the judgment unit 123 may judge whether or not each radio terminal UE connected to the radio communication unit 111#1 is capable of performing radio communications in the component carrier #2 in order to judge whether or not each radio terminal UE connected to the radio communication unit 111#1 can be connected to the radio communication unit 111#2. If the measurement report that the radio communication unit 111#1 receives from each radio terminal UE does not include information on the received power level corresponding to the radio communication unit 111#2, the radio terminal UE can be judged as incapable of performing radio communications in the component carrier #2.

Thirdly, the judgment unit 123 judges whether or not the load level of the radio communication unit 111#2 is lower than a predetermined level. The load level of the radio communication unit 111#2 is identified by the load level identifying unit 122. Here, the predetermined level is set in advance at a value within such a range of the load level that allows the radio communication unit 111#2 to operate normally; and the predetermined level is stored in the storage unit 130.

When all of the above three judgment results are positive, the judgment unit 130 notifies the connection changeover controller 124 of this fact. More specifically, when the number of radio terminals UE being connected to the radio communication unit 111#1 is smaller than the predetermined number, when each radio terminal UE connected to the radio communication unit 111#1 can be connected to the radio communication unit 111#2, and when the load level of the radio communication unit 111#2 is lower than the predetermined level, the judgment unit 123 notifies the connection changeover controller 124 of this fact.

The connection changeover controller 124 performs handover control upon notification from the judgment unit 123 of the fact that all the above three judgment results are positive, the handover control being performed to change the connection target of each radio terminal UE, which is connected to the radio communication unit 111#1, to the radio communication unit 111#2.

The power consumption controller 126 controls the power unit 150 such that the radio communication unit 111#1 is changed from the active mode to the inactive mode, after the connection changeover controller 124 changes the connection target of each radio terminal UE, which is connected to the radio communication unit 111#1, to the radio communication unit 111#2.

(2.3) Operation of Radio Communication System

Figure 8:
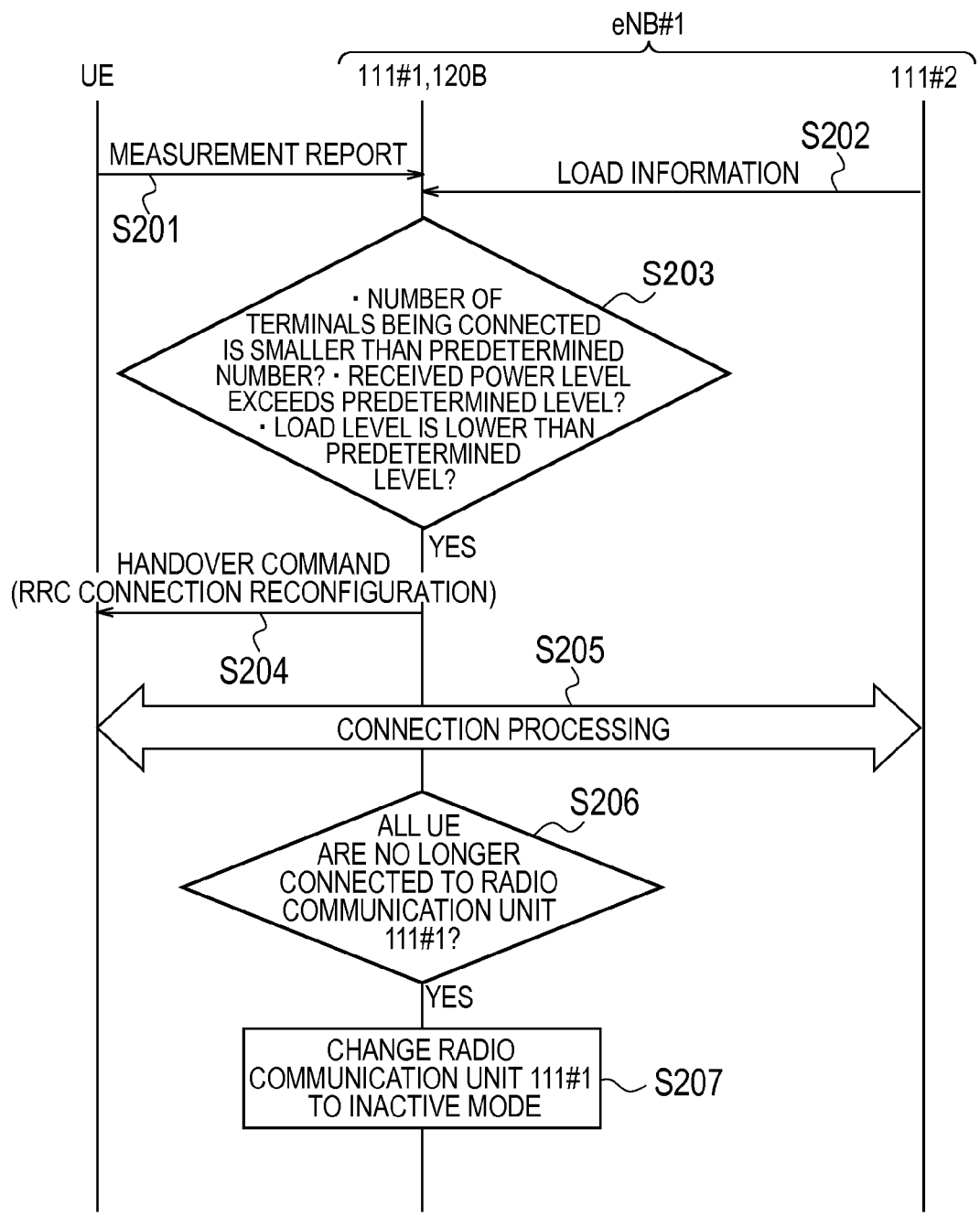
FIG. 8 is an operational sequence diagram showing the operation of the radio communication system according to the second embodiment.

FIG. 8 is an operational sequence diagram showing the operation of the radio communication system 1B according to the second embodiment. Although one radio terminal UE is connected to the radio communication unit 111#1 here, two or more radio terminals UE may be connected to the radio communication unit 111#1.

In Step S201, the radio communication unit 111#1 of the radio base station eNB#1 receives a measurement report from each radio terminal UE connected to the radio communication unit 111#1. Based on the measurement reports received by the radio communication unit 111#1, the received power level identifying unit 121 of the radio communication unit 111#1 identifies received power levels, of each radio terminal UE, corresponding respectively to the radio communication units 111#1 and 111#2.

In Step S202, the load level identifying unit 122 of the radio base station eNB#1 identifies the load level of the radio communication unit 111#2.

In Step S203, the judgment unit 123 of the radio base station eNB#1 makes the above three judgments on the basis of the received power levels identified by the received power level identifying unit 121 and the load level identified by the load level identifying unit 122. The process moves to Step S204 if all of the above three judgment results are positive, whereas the process returns to the beginning of this sequence if any of the above three judgment results is negative.

In Step S204, the connection changeover controller 124 of the radio base station eNB#1 generates upper-layer information (RRC Connection Reconfiguration message) indicating that the primary component carrier of each radio terminal UE connected to the radio communication unit 111#1 (component carrier #1) is changed to the component carrier #2 (i.e., is handed over to the component carrier #2), and outputs the generated upper-layer information to the radio communication unit 111#1. The radio communication unit 111#1 sends the upper-layer information to the radio terminal UE through Physical Downlink Control Channel.

In Step S205, the radio terminal UE performs connection processing with the radio communication unit 111#2. More specifically, the radio terminal UE establishes synchronization with the radio communication unit 111#2 and performs other processing.

In Step S206, the connection changeover controller 124 of the radio base station eNB#1 judges whether or not all the radio terminals UE having been connected to the radio communication unit 111#1 complete the change of the connection target (handover) to the radio communication unit 111#2. If the change is not completed, the process moves to Step S207; if not, the process returns to the beginning of this sequence.

In Step S207, the power consumption controller 126 of the radio base station eNB#1 controls the power unit 150 such that the radio communication unit 111#1 is changed from the active mode to the inactive mode.

(2.4) Effect of Second Embodiment

As has been described, in the active mode, the controller 120B of the radio base station eNB#1 controls the power unit 150 such that the active mode is changed to the inactive mode after satisfaction of the condition where the received power level of the reference signal, which each radio terminal UE connected to the radio communication unit 111#1 receives from the radio communication unit 111#2, exceeds the predetermined level. Alternatively, in the active mode, the controller 120B of the radio base station eNB#1 controls the power unit 150 such that the active mode is changed to the inactive mode after satisfaction of the condition where each radio terminal UE connected to the radio communication unit 111#1 is capable of performing radio communications in the component carrier #2. In the inactive mode, power supply to the radio communication unit 111#1 is stopped.

Thereby, the radio communication unit 111#1 is stopped and the connection between the radio communication unit 111#1 and each radio terminal UE is disconnected; however, the radio terminals UE having been connected to the radio communication unit 111#1 can be connected to the radio communication unit 111#2. This can prevent each radio terminal UE from becoming unable to perform communications.

In the second embodiment, in the active mode, the controller 120B of the radio base station eNB#1 controls the power unit 150 such that the active mode is changed to the inactive mode after satisfaction of the condition where the number of radio terminals UE being connected to the radio communication unit 111#1 is smaller than the predetermined number.

If the active mode is changed to the inactive mode when the number of radio terminals UE being connected to the radio communication unit 111#1 is large, a large number of UEs are reconnected to the radio communication unit 111#2, which increases a load on the radio communication unit 111#2. For this reason, the active mode is not changed to the inactive mode when the number of radio terminals UE being connected to the radio communication unit 111#1 is large. Thereby, the load on the radio communication unit 111#2 can be prevented from being increased.

In the second embodiment, in the active mode, the controller 120B of the radio base station eNB#1 controls the power unit 150 such that the active mode is changed to the inactive mode after satisfaction of the condition where the load level of the radio communication unit 111#2 is lower than the predetermined level.

If the radio communication unit 111#1 is changed from the active mode to the inactive mode when the load level of the radio communication unit 111#2 is high, the radio terminals UE connected to the radio communication unit 111#1 are reconnected to the radio communication unit 111#2, which in turn might make the load on the radio communication unit 111#2 exceed the capacity of the radio communication unit 111#2. For this reason, the radio communication unit 111#1 is changed from the active mode to the inactive mode only when the load level of the radio communication unit 111#2 is not high. Thereby, the load on the radio communication unit 111#2 can be prevented from exceeding the capacity of the radio communication unit 111#2.

In the second embodiment, the power unit 150 is controlled to change the mode from the active mode to the inactive mode after the connection target of each radio terminal UE, which is connected to the radio communication unit 111#1, is changed to the radio communication unit 111#2. This can prevent disconnection of communication of each radio terminal UE connected to the radio communication unit 111#1. Accordingly, a good service can be provided to each radio terminal UE having been connected to the radio communication unit 111#1 while the power consumption of the radio communication unit 111#1 is saved.

(3) Third Embodiment

A third embodiment of the present invention will be described in the following order: (3.1) Configuration of Radio Communication System; (3.2) Configuration of Control Device; (3.3) Operation of Radio Communication System; (3.4) Effect of Third Embodiment; and (3.5) Modification of Third Embodiment.

In the third embodiment, a radio base station eNB has a configuration separated into multiple small radio devices as a RF part and a control device as a BB part. Such a small radio device is sometimes called a remote radio head (RRH).

In the third embodiment, features different from those of the first embodiment will be mainly described and overlapping description will be omitted.

(3.1) Configuration of Radio Communication System

Figure 9:
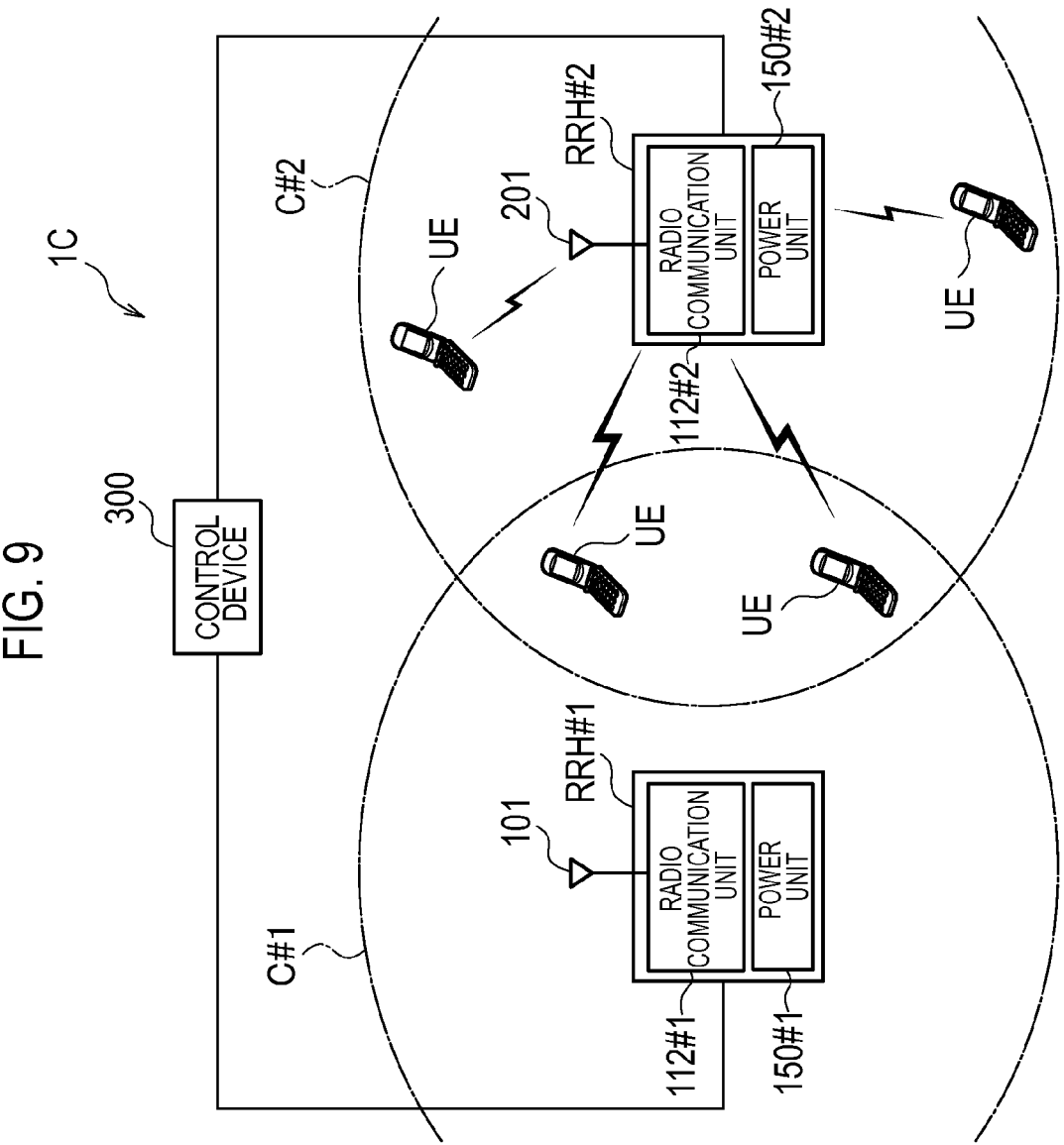
FIG. 9 is a schematic configuration diagram showing the schematic configuration of a radio communication system according to a third embodiment.

FIG. 9 is a schematic configuration diagram showing the schematic configuration of a radio communication system 1C according to the third embodiment.

As shown in FIG. 9, the radio communication system 1C includes: a small radio device RRH#1 forming a cell C#1; a small radio device RRH#2 neighboring the small radio device RRH#1 and forming a cell C#2; and a control device 300 controlling the small radio devices RRH#1 and RRH#2.

The small radio device RRH#1 and the control device 300 are connected to each other, and the small radio device RRH#2 and the control device 300 are connected to each other through optical fiber lines or the like.

The small radio device RRH#1 includes: an antenna 101; a radio communication unit 112#1; and a power unit 150#1.

The antenna 101 is used for sending and receiving a radio signal.

The radio communication unit 112#1 includes a radio frequency (RF) circuit and the like, for example, and exchanges radio signals with each radio terminal UE, which is connected to the small radio device RRH#1, through the antenna 101. In the third embodiment, the radio communication unit 112#1 corresponds to a first radio communication unit.

The power unit 150#1 supplies power to the radio communication unit 112#1 when the small radio device RRH#1 is in an active mode, and stops power supply to the radio communication unit 112#1 when the small radio device RRH#1 is in an inactive mode.

In the third embodiment, a mode where the power unit 150#1 supplies power to the radio communication unit 112#1 is called an "active mode (first mode);" and a mode where the power unit 150#1 stops power supply to the radio communication unit 112#1 is called an "inactive mode (second mode)."

The small radio device RRH#2 includes: an antenna 201; a radio communication unit 112#2; and a power unit 150#2.

The antenna 201 is used for sending and receiving a radio signal.

The radio communication unit 112#2 includes a radio frequency (RF) circuit and the like, for example, and exchanges radio signals with each radio terminal UE, which is connected to the small radio device RRH#2, through the antenna 201. In the third embodiment, the radio communication unit 112#2 corresponds to a second radio communication unit.

The power unit 150#2 supplies power to the radio communication unit 112#2 when the small radio device RRH#2 is in an active mode, and stops power supply to the radio communication unit 112#2 when the small radio device RRH#2 is in an inactive mode.

The cell C#2 partially overlaps the cell C#1. The two radio terminals UE connected to the small radio device RRH#1 are located in a portion where the cell C#1 and the cell C#2 overlap. For this reason, the two radio terminals UE connected to the small radio device RRH#1 are in a state where their connection target can be changed to the small radio device RRH#2.

Each radio terminal UE measures the received power level of a reference signal (RSRP: Reference Signal Received Power) received from each of the small radio device RRH#1 and the small radio device RRH#2, and sends its connection target small radio device RRH a report on the measurement result of the received power level (measurement report).

Each of the two radio terminals UE connected to the small radio device RRH#1 sends the small radio device RRH#1 a measurement report including information on the received power level measured with respect to the small radio device RRH#1 and information on the received power level measured with respect to the small radio device RRH#2.

(3.2) Configuration of Control Device

Figure 10:
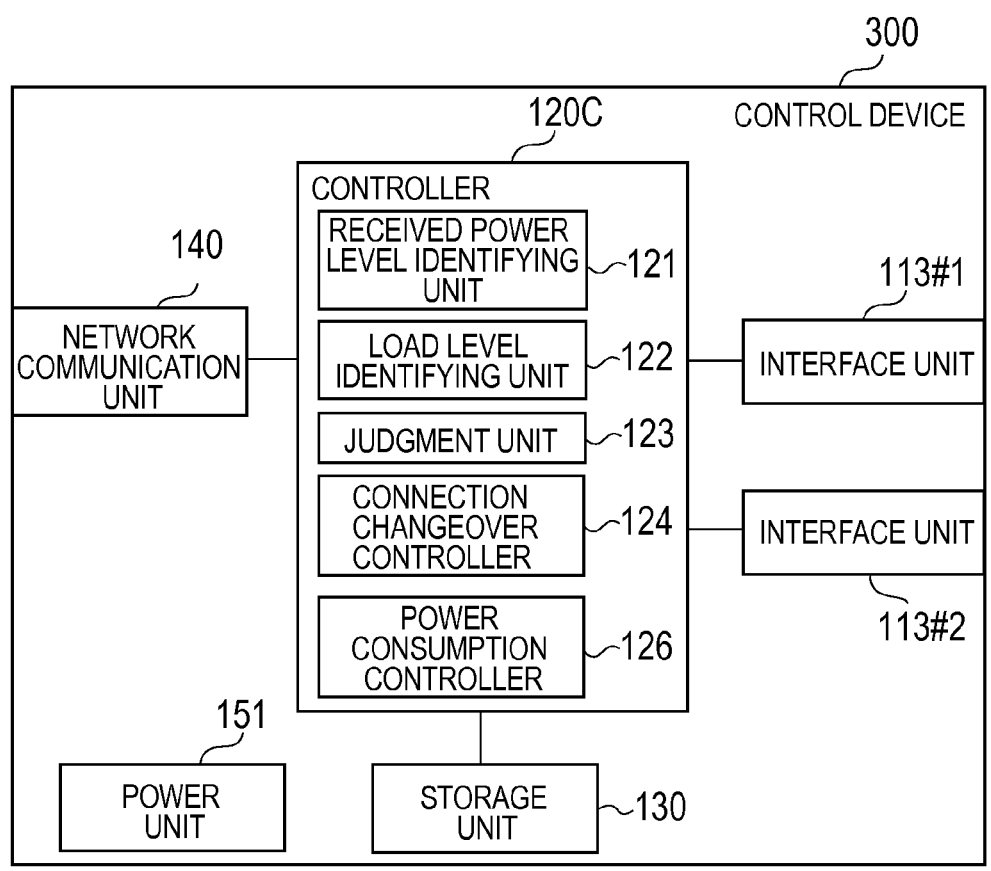
FIG. 10 is a block diagram showing the configuration of a control device according to the third embodiment.

Next, the configuration of the control device 300 according to the third embodiment will be described. The control device 300 constitutes a radio base station eNB together with the small radio devices RRH#1 and RRH#2. FIG. 10 is a block diagram showing the configuration of the control device 300.

As shown in FIG. 10, the control device 300 includes: an interface unit 113#1; an interface unit 113#2; a controller 120C; a storage unit 130; a network communication unit 140; and a power unit 151.

The interface unit 113#1 includes a baseband (BB) circuit and the like, and works as an interface to the small radio device RRH#1. The interface unit 113#2 includes a baseband (BB) circuit and the like, and works as an interface to the small radio device RRH#2.

The controller 120C includes a CPU, for example, and controls various functions that the radio base station eNB has. In the third embodiment, the controller 120C corresponds to a controller configured to control the first radio communication unit. The storage unit 130 includes a memory, for example, and stores various kinds of information used for, for example, the control of the radio base station eNB. The network communication unit 140 performs inter-base station communications with another radio base station eNB by using an X2 interface. The power unit 151 supplies power to each of the blocks of the control device 300.

The controller 120C includes: a received power level identifying unit 121; a load level identifying unit 122; a judgment unit 123; a connection changeover controller 124; and a power consumption controller 126.

The received power level identifying unit 121 identifies received power levels of the small radio devices RRH#1 and RRH#2, respectively, at each radio terminal UE connected to the small radio device RRH#1 on the basis of the measurement report that the small radio device RRH#1 receives from the radio terminal UE.

The load level identifying unit 122 identifies the load level of the small radio device RRH#2. The load level of the small radio device RRH#2 indicates the number of PRBs (Physical Resource Blocks) being used in the small radio device RRH#2, the PRB being the allocation unit of time-frequency resources, or indicates a load on the hardware of the small radio device RRH#2.

The judgment unit 123 makes the following three judgments in the active mode on the basis of the received power levels identified by the received power level identifying unit 121 and the load level identified by the load level identifying unit 122.

Firstly, the judgment unit 123 judges whether or not the number of radio terminals UE being connected to the small radio device RRH#1 is smaller than a predetermined number. The number of radio terminals UE being connected to the small radio device RRH#1 is identified based on the state of use of frequency resources or radio bearers and on information from the MME. Here, the predetermined number is set in advance at such a value that the load level of the small radio device RRH#2 would not be increased too much even if each radio terminal UE connected to the small radio device RRH#1 changes its connection target to the small radio device RRH#2; and the predetermined number is stored in the storage unit 130.

Secondly, the judgment unit 123 judges whether or not each radio terminal UE connected to the small radio device RRH#1 can be connected to the small radio device RRH#2. More specifically, the judgment unit 123 judges whether or not the received power level of the reference signal, which each radio terminal UE connected to the small radio device RRH#1 receives from the small radio device RRH#2, exceeds a predetermined level. The received power level of the reference signal is the one identified by the received power level identifying unit 121. Here, the predetermined level is set in advance at such a value that each radio terminal UE connected to the small radio device RRH#1 can receive control information from the small radio device RRH#2 normally when the radio terminal UE changes its connection target to the small radio device RRH#2; and the predetermined level is stored in the storage unit 130.

Thirdly, the judgment unit 123 judges whether or not the load level of the small radio device RRH#2 is lower than a predetermined level. The load level of the small radio device RRH#2 is identified by the load level identifying unit 122. Here, the predetermined level is set in advance at a value within such a range of the load level that allows the small radio device RRH#2 to operate normally; and the predetermined level is stored in the storage unit 130.

When all of the above three judgment results are positive, the judgment unit 130 notifies the connection changeover controller 124 of this fact. More specifically, when the number of radio terminals UE being connected to the small radio device RRH#1 is smaller than the predetermined number, when each radio terminal UE connected to the small radio device RRH#1 can be connected to the small radio device RRH#2, and when the load level of the small radio device RRH#2 is lower than the predetermined level, the judgment unit 123 notifies the connection changeover controller 124 of this fact.

The connection changeover controller 124 performs control upon notification from the judgment unit 123 of the fact that all the above three judgment results are positive, the control being performed to change the connection target of each radio terminal UE, which is connected to the small radio device RRH#1, to the small radio device RRH#2.

The power consumption controller 126 controls the power unit 150#1 such that the small radio device RRH#1 is changed from the active mode to the inactive mode, after the connection changeover controller 124 changes the connection target of each radio terminal UE, which is connected to the small radio device RRH#1, to the small radio device RRH#2.

(3.3) Operation of Radio Communication System

FIG. 11 is an operational sequence diagram showing the operation of the radio communication system 1C according to the third embodiment. Although one radio terminal UE is connected to the small radio device RRH#1 here, two or more radio terminals UE may be connected to the small radio device RRH#1.

In Step S301, the radio communication unit 112#1 of the small radio device RRH#1 receives a measurement report from each radio terminal UE connected to the small radio device RRH#1. Based on the measurement reports received by the small radio device RRH#1, the received power level identifying unit 121 of the control device 300 identifies received power levels, of each radio terminal UE, corresponding respectively to the small radio devices RRH#1 and RRH#2.

In Step S302, the load level identifying unit 122 of the control device 300 identifies the load level of the small radio device RRH#2.

In Step S303, the judgment unit 123 of the control device 300 makes the above three judgments on the basis of the received power levels identified by the received power level identifying unit 121 and the load level identified by the load level identifying unit 122. The process moves to Step S304 if all of the above three judgment results are positive, whereas the process returns to the beginning of this sequence if any of the above three judgment results is negative.

In Step S304, the connection changeover controller 124 of the control device 300 generates a Handover Command message indicating instructions for the change of the connection target to the small radio device RRH#2, and outputs the generated Handover Command message to the small radio device RRH#1. The small radio device RRH#1 sends the Handover Command message to each radio terminal UE.

In Step S305, the radio terminal UE performs connection processing with the small radio device RRH#2. More specifically, the radio terminal UE establishes synchronization with the small radio device RRH#2 and performs other processing.

In Step S306, the connection changeover controller 124 of the control device 300 judges whether or not all the radio terminals UE having been connected to the small radio device RRH#1 complete the change of the connection target (handover) to the small radio device RRH#2. If the change is completed, the process moves to Step S307; if not, the process returns to the beginning of this sequence.

In Step S307, the power consumption controller 126 of the radio base station eNB#1 controls the power unit 150#1 such that the power unit 150#1 changes the small radio device RRH#1 from the active mode to the inactive mode.

(3.4) Effect of Third Embodiment

As has been described, in the active mode, the controller 120C controls the power unit 150#1 such that the power unit 150#1 changes the mode from the active mode to the inactive mode after satisfaction of the condition where the received power level of the reference signal, which each radio terminal UE connected to the small radio device RRH#1 receives from the small radio device RRH#2, exceeds the predetermined level. In the inactive mode, power supply to the small radio device RRH#1 is stopped.

Thereby, the small radio device RRH#1 is stopped and the connection between the small radio device RRH#1 and each radio terminal UE is disconnected; however, the radio terminals UE having been connected to the small radio device RRH#1 can be connected to the small radio device RRH#2. This can prevent each radio terminal UE from becoming unable to perform communications.

In the third embodiment, in the active mode, the controller 120C controls the power unit 150#1 such that the power unit 150#1 changes the mode from the active mode to the inactive mode after satisfaction of the condition where the number of radio terminals UE being connected to the small radio device RRH#1 is smaller than the predetermined number.

If the active mode is changed to the inactive mode when the number of radio terminals UE being connected to the small radio device RRH#1 is large, a large number of UEs are reconnected to the small radio device RRH#2, which increases a load on the small radio device RRH#2. For this reason, the mode is not changed from the active mode to the inactive mode when the number of radio terminals UE being connected to the small radio device RRH#1 is large. Thereby, the load on the small radio device RRH#2 can be prevented from being increased.

In the third embodiment, in the active mode, the controller 120C of the radio base station eNB#1 controls the power unit 150#1 such that the power unit 150#1 changes the mode from the active mode to the inactive mode after satisfaction of the condition where the load level of the small radio device RRH#2 is lower than the predetermined level.

If the small radio device RRH#1 is changed from the active mode to the inactive mode when the load level of the small radio device RRH#2 is high, the radio terminals UE connected to the small radio device RRH#1 are reconnected to the small radio device RRH#2, which in turn might the load on the small radio device RRH#2 exceed the capacity of the small radio device RRH#2. For this reason, the small radio device RRH#1 is changed from the active mode to the inactive mode only when the load level of the small radio device RRH#2 is not high. Thereby, the load on the small radio device RRH#2 can be prevented from exceeding the capacity of the small radio device RRH#2.

In the third embodiment, the power unit 150#1 is controlled to change the mode from the active mode to the inactive mode after the connection target of each radio terminal UE, which is connected to the small radio device RRH#1, is changed to the small radio device RRH#2. This can prevent disconnection of communication of each radio terminal UE connected to the small radio device RRH#1. Accordingly, a good service can be provided to each radio terminal UE having been connected to the small radio device RRH#1 while the power consumption of the small radio device RRH#1 is saved.

(3.5) Modification of Third Embodiment

In the third embodiment described above, the judgment unit 123 judges whether or not the received power level of the reference signal, which each radio terminal UE connected to the small radio device RRH#1 receives from the small radio device RRH#2, exceeds the predetermined level, in order to judge whether or not each radio terminal UE connected to the small radio device RRH#1 can be connected to the small radio device RRH#2.

However, the judgment method is not limited to one based on the received power level of the reference signal; instead, a judgment method based on positional information of each radio terminal UE connected to the small radio device RRH#1 may be used. More specifically, whether or not each radio terminal UE connected to the small radio device RRH#1 is located in the cell C#2 of the small radio device RRH#2 may be judged based on the positional information of each radio terminal UE connected to the small radio device RRH#1. Here, the following methods may be used as a method for identifying the position of each radio terminal UE.

(Position Identifying Method 1) In a case where each radio terminal UE connected to the small radio device RRH#1 has a GPS (Global Positioning System) positioning function, positional information generated with GPS is acquired for each radio terminal UE.

(Position Identifying Method 2) In a case where each radio terminal UE connected to the small radio device RRH#1 has no GPS positioning function, positional information for each radio terminal UE is acquired from a position managing server (E-SLMC: Evolved Serving Mobile Location Center) provided on a core network side. Refer to 3GPP TS36.305 for details of the position managing server (E-SLMC).

(Position Identifying Method 3) In a case where the cell C#1 formed by the small radio device RRH#1 is divided into sectors, rough positional information of each radio terminal UE can be obtained by using information, for example, on a direction where the small radio device RRH#1 is located and on the path loss between the small radio device RRH#1 and each radio terminal UE located in the sectors corresponding to the small radio device RRH#1.

(4) Other Embodiments

Although contents of the present invention have been described according to the foregoing embodiments of the invention, it should not be understood that descriptions and drawings constituting part of this disclosure limit the present invention. From this disclosure, various alternative embodiments, examples, and operation techniques will be easily found by those skilled in the art.

In the above embodiments, the radio communication system based on LTE (3GPP Release 8 or 9) has been described. However, since LTE Advanced (3GPP Release 10), which is an advanced type of LTE, is expected to provide a heterogeneous network where multiple types of radio base stations with different transmission powers are mixed, the present invention may be applied to the heterogeneous network. Further, since LTE Advanced is expected to provide a relay node which is a radio base station whose backhaul is constituted by a radio interface, the relay node may be set as the radio base station according to the present invention.

Furthermore, although the LTE system has been described in the above embodiments, the present invention may be applied to another radio communication system such as a radio communication system based on Mobile WiMAX (IEEE 802.16e).

As described above, it should be understood that the present invention includes various embodiments and the like which are not described herein. Accordingly, the scope of the present invention should be determined only by the matters specifying the invention in the scope of claims regarded as appropriate based on this disclosure.

Note that the entire contents of Japanese Patent Application No. 2010-140010 (filed on Jun. 18, 2010) are incorporated herein by reference.

INDUSTRIAL APPLICABILITY

As has been described, the radio communication system, the radio base station, and the communication control method according to the present invention are capable of providing a good service to a radio terminal while saving power consumption, and thus are useful in radio communications such as mobile communications.

The invention claimed is:

1. A radio communication system comprising:
a first radio communication unit that forms a first cell and to which a radio terminal in the first cell is connected;

a second radio communication unit that forms a second cell overlapping the first cell at least partially and to which a radio terminal in the second cell is connected; and a controller that controls the first radio communication unit, wherein the first radio communication unit is changeable from a first mode to a second mode where power consumption is lower than in the first mode, and in a case where the first radio communication unit is in the first mode, the controller performs control such that the first radio communication unit is changed to the second mode after satisfaction of a predetermined condition indicating that a currently-connected radio terminal being connected to the first radio communication unit is connectable to the second radio communication unit.

2. The radio communication system according to claim 1, wherein the predetermined condition is that a received power level of a signal received by the currently-connected radio terminal from the second radio communication unit exceeds a predetermined level.

3. The radio communication system according to claim 1, wherein the first mode is a mode where power is supplied to the first radio communication unit, and the second mode is a mode where power supply to the first radio communication unit is stopped.

4. The radio communication system according to claim 1, wherein, in the case where the first radio communication unit is in the first mode, the controller performs control such that the first radio communication unit is changed to the second mode if the number of currently-connected radio terminals is smaller than a predetermined number and after the predetermined condition is satisfied.

5. The radio communication system according to claim 4, wherein the controller performs control such that a connection target of each currently-connected radio terminal is changed to the second radio communication unit if the number of currently-connected radio terminals is smaller than the predetermined number and if the predetermined condition is satisfied, in the case where the first radio communication unit is in the first mode, and performs control such that the first radio communication unit is changed to the second mode after the connection targets of all the currently-connected radio terminals are changed to the second radio communication unit.

6. The radio communication system according to claim 5, wherein, in the case where the first radio communication unit is in the first mode, the controller performs control such that the connection target of each currently-connected radio terminal is changed to the second radio communication unit if the number of currently-connected radio terminals is smaller than the predetermined number, if the predetermined condition is satisfied, and if a load level of the second radio communication unit is lower than a predetermined level.

7. The radio communication system according to claim 1, wherein the first radio communication unit and the controller are provided in a first radio base station, and the second radio communication unit is provided in a second radio base station neighboring the first radio base station.

8. The radio communication system according to claim 1, wherein the first cell is formed using a given frequency band, the second cell is formed using a frequency band different from the given frequency band, and the first radio communication unit, the second radio communication unit, and the controller are provided in one radio base station.

9. The radio communication system according to claim 1, wherein the first radio communication unit is provided in a first small radio device, the second radio communication unit is provided in a second small radio device neighboring the first small radio device, the controller is provided in a control device that controls the first small radio device and the second small radio device, and the first small radio device, the second small radio device, and the control device form one radio base station.

10. A radio base station used in a radio communication system including:

a first radio communication unit that forms a first cell and to which a radio terminal in the first cell is connected; and a second radio communication unit that forms a second cell overlapping the first cell at least partially and to which a radio terminal in the second cell is connected, the radio base station comprising a controller that controls the first radio communication unit, wherein the first radio communication unit is changeable from a first mode to a second mode where power consumption is lower than in the first mode, and in a case where the first radio communication unit is in the first mode, the controller performs control such that the first radio communication unit is changed to the second mode after satisfaction of a predetermined condition indicating that a currently-connected radio terminal being connected to the first radio communication unit is connectable to the second radio communication unit.

11. A communication control method used in a radio communication system including:

a first radio communication unit that forms a first cell and to which a radio terminal in the first cell is connected; and a second radio communication unit that forms a second cell overlapping the first cell at least partially and to which a radio terminal in the second cell is connected, the first radio communication unit being changeable from a first mode to a second mode where power consumption is lower than in the first mode, the method comprising the step of performing control such that the first radio communication unit is changed to the second mode after satisfaction of a predetermined condition indicating that a currently-connected radio terminal being connected to the first radio communication unit is connectable to the second radio communication unit, in a case where the first radio communication unit is in the first mode.

* * * * *